United States Patent [19]
Kobayashi

[11] Patent Number: 6,163,624
[45] Date of Patent: Dec. 19, 2000

[54] IMAGE PROCESSING CIRCUIT

[75] Inventor: Setsuya Kobayashi, Ikoma-gun, Japan

[73] Assignee: Sharp Kabushiki Kaisha, Osaka, Japan

[21] Appl. No.: 09/095,373

[22] Filed: Jun. 10, 1998

[30] Foreign Application Priority Data

Jul. 11, 1997 [JP] Japan ................................ 9-186360

[51] Int. Cl.[7] .................................................. G06K 9/46
[52] U.S. Cl. ........................ 382/194; 382/195; 382/205; 358/462
[58] Field of Search .................................. 382/192, 194, 382/195, 205, 176; 358/462, 464

[56] References Cited

U.S. PATENT DOCUMENTS

| 4,722,008 | 1/1988 | Ibaraki et al. | 358/464 |
|---|---|---|---|
| 5,014,124 | 5/1991 | Fujisawa | 358/462 |
| 5,016,118 | 5/1991 | Nannichi | 358/462 |
| 5,296,939 | 3/1994 | Suzuki | 358/462 |
| 5,701,364 | 12/1997 | Kanno | 382/176 |
| 5,892,592 | 4/1999 | Adachi et al. | 358/462 |

FOREIGN PATENT DOCUMENTS

| 0 113 410 A2 | 7/1984 | European Pat. Off. . |
|---|---|---|
| 0 714 199 A2 | 5/1996 | European Pat. Off. . |
| 4-188948 | 7/1992 | Japan . |
| 4-270561 | 9/1992 | Japan . |
| 5-336356 | 12/1993 | Japan . |

*Primary Examiner*—Thomas D. Lee
*Attorney, Agent, or Firm*—Dike, Bronstein, Roberts & Cushman, LLP; David G. Conlin; William J. Daley, Jr.

[57] ABSTRACT

An image processing circuit of the present invention includes a succession calculating circuit. In the succession calculating circuit, an average value calculating circuit determines an average value of image data, inputted via line memories, in a specific region, and a multivalue-binary converting circuit converts, in accordance with the average value, the image data into binary data in which the entire image data in the specific region are separated into black pixels and white pixels. A succeeding black pixels calculating circuit calculates the number of succeeding black pixels each in a main scanning direction and in a sub scanning direction, and determines respective maximum values in the main scanning direction and in the sub scanning direction so as to output the respective maximum values as a main scanning direction maximum succession and a sub scanning direction maximum succession. The types of the specific region including the target pixel are discriminated in accordance with the succession, a complexity, and a compared subtracted value so as to carry out an image process in accordance with image types, thus improving discrimination accuracy of image features, used for selecting of an image process which should be carried out, without causing the size of the circuit to increase.

10 Claims, 11 Drawing Sheets

| 0 | 0 | -1 | 0 | 0 |
|---|---|----|---|---|
| 0 | 0 | -2 | 0 | 0 |
| -1 | -2 | 13 | -2 | -1 |
| 0 | 0 | -2 | 0 | 0 |
| 0 | 0 | -1 | 0 | 0 |

FIG.9(B)

| 0 | 0 | -1 | 0 | 0 |
|---|---|----|---|---|
| 0 | 0 | -1 | 0 | 0 |
| -1 | -1 | 9 | -1 | -1 |
| 0 | 0 | -1 | 0 | 0 |
| 0 | 0 | -1 | 0 | 0 |

FIG.9(C)

| 0 | 0 | 0 | 0 | 0 |
|---|---|---|---|---|
| 0 | 0 | -1 | 0 | 0 |
| 0 | -1 | 5 | -1 | 0 |
| 0 | 0 | -1 | 0 | 0 |
| 0 | 0 | 0 | 0 | 0 |

FIG.9(D)

| 0 | 0 | 2/48 | 0 | 0 |
|---|---|------|---|---|
| 0 | 0 | 4/48 | 0 | 0 |
| 2/48 | 4/48 | 24/48 | 4/48 | 2/48 |
| 0 | 0 | 4/48 | 0 | 0 |
| 0 | 0 | 2/48 | 0 | 0 |

FIG.9(E)

| 0 | 0 | 1/24 | 0 | 0 |
|---|---|------|---|---|
| 0 | 0 | 2/24 | 0 | 0 |
| 1/24 | 2/24 | 12/24 | 2/24 | 1/24 |
| 0 | 0 | 2/24 | 0 | 0 |
| 0 | 0 | 1/24 | 0 | 0 |

FIG.9(F)

| 0 | 0 | 0 | 0 | 0 |
|---|---|---|---|---|
| 0 | 0 | 1/8 | 0 | 0 |
| 0 | 1/8 | 4/8 | 1/8 | 0 |
| 0 | 0 | 1/8 | 0 | 0 |
| 0 | 0 | 0 | 0 | 0 |

FIG.9(G)

| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

FIG.9(H)

| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

FIG. 10

| K6 | K5 | K4 | K5 | K6 |
| K5 | K3 | K2 | K3 | K5 |
| K4 | K2 | K1 | K2 | K4 |
| K5 | K3 | K2 | K3 | K5 |
| K6 | K5 | K4 | K5 | K6 |

| G(i-2,j-2) | G(i-1,j-2) | G(i,j-2) | G(i+1,j-2) | G(i+2,j-2) |
|---|---|---|---|---|
| G(i-2,j-1) | G(i-1,j-1) | G(i,j-1) | G(i+1,j-1) | G(i+2,j-1) |
| G(i-2,j) | G(i-1,j) | G(i,j) | G(i+1,j) | G(i+2,j) |
| G(i-2,j+1) | G(i-1,j+1) | G(i,j+1) | G(i+1,j+1) | G(i+2,j+1) |
| G(i-2,j+2) | G(i-1,j+2) | G(i,j+2) | G(i+1,j+2) | G(i+2,j+2) |

IMAGE PROCESSING CIRCUIT

FIELD OF THE INVENTION

The present invention relates to an image processing circuit, for use in image processing devices such as digital copying machine and scanners, for processing image data which have been read out by a photoelectric conversion device such as CCD, and particularly to an image processing circuit for discriminating features of a region including each pixel data of an image which has been read out so as to carry out image processing in accordance with the features thus discriminated.

BACKGROUND OF THE INVENTION

In some image processing devices such as a digital copying machine and a scanner, image processing is carried out so as to improve an image quality with respect to image data which have been read out by a photoelectric conversion device such as CCD. As such image processing, an enhancement process for enhancing a border region where image density is changed, and a smoothing process for suppressing an abrupt change in image density are available. However, in order to improve the image quality, it is required to select and carry out an image process which is most suitable for the feature of the image.

As such image processing, Japanese Unexamined Patent Publication No. 188948/1992 (Tokukaihei 4-188948) discloses an arrangement wherein judgement of a region is carried out per feature of an image in accordance with an average variance which has been determined from a difference between an average value of image data and each image data in a specific region.

Also, Japanese Unexamined Patent Publication No. 270561/1992 (Tokukaihei 4-270561) discloses a method for discriminating between a character image region and a halftone region in accordance with two threshold values THb (larger) and THc (smaller) that are set beforehand. More specifically, a region whose density level exceeds the threshold value THb and a region whose density level is lower than the threshold value THc are judged as a character image region, while a region whose density level falls in a range between the threshold value THb and the threshold value THc is judged as a halftone region.

Further, U.S. Pat. No. 4,722,008 discloses a method in which an image is divided into a plurality of blocks, each composed of pixels, and a change in signal levels of two succeeding pixels in each block is measured with respect to a main scanning direction and a sub scanning direction so as to discriminate whether each block is a spot region in accordance with the result of comparison between the sum of measured value of each block and a preset value.

However, the conventional image discriminating methods have a problem that respective features of image types of a character image, a spot image, and a photographic image cannot be extracted accurately, and the image region cannot be discriminated with high accuracy.

Namely, it is not necessarily the case that the average variance in the specific region is clearly changed in accordance with the image type, and it is often the case that the image types cannot be discriminated solely by the average variance. Also, in the method in which the density level is compared with the threshold values, it is difficult to set the threshold values for distinguishing image types, and in the case where the threshold values are set inappropriately, the discrimination accuracy of image types is greatly lowered.

Further, in the method as disclosed in U.S. Pat. No. 4,722,008, while it is possible to discriminate whether the image region subjected to discrimination is a binary image region or a halftone region, it is impossible to accurately distinguish a character image from a photographic image.

SUMMARY OF THE INVENTION

It is an object of the present invention to provide an image processing circuit capable of improving discrimination accuracy of image types without causing a large increase in a size of the circuit.

An image processing circuit of the present invention for discriminating, in accordance with multivalue image data obtained through scanning of a document, features of a region to which each pixel of an image belongs is characterized by including multivalue converting means for calculating a threshold value from all image data in a specific region so as to convert pixel data in the specific region in accordance with the threshold value, succeeding pixels calculating means for calculating, in accordance with the converted pixel data in the specific region, the number of pixels of equal density per line in each of a main scanning direction and a sub scanning direction, succession extracting means for adding the number of pixels of equal density, as calculated by the succeeding pixels calculating means, with respect to adjacent image data in the main scanning direction and in the sub scanning direction, and determining, in accordance with results of addition, a maximum value in the main scanning direction and a maximum value in the sub scanning direction so as to output respective maximum values as a main scanning direction succession and a sub scanning direction succession, respectively, wherein the features of the region are discriminated in accordance with the main scanning direction succession and the sub scanning direction succession as extracted by the succession extracting means.

With this arrangement, first, a threshold value is calculated from all image data in the specific region, and the pixel data in the specific region are converted in accordance with the threshold value, and then the number of succeeding pixels of equal density in the pixels in the specific region after conversion is calculated per each line in the main scanning direction and in the sub scanning direction, and thereafter the number of succeeding pixels of equal density thus calculated is added with respect to adjacent image data in the main scanning direction and in the sub scanning direction, and from the results of addition, the maximum value in the main scanning direction and the maximum value in the sub scanning direction are determined as the main scanning direction succession and the sub scanning direction succession, respectively, and the features of the image are discriminated in accordance with the main scanning direction succession and the sub scanning direction succession. Thus, successions are extracted as feature parameters in accordance with all the image data in the specific region including a target pixel, to be subjected to image feature discrimination, and a plurality of neighboring pixels surrounding the target pixel, and the image features are discriminated in accordance with the successions thus extracted.

It is preferable that the succession extracting means includes comparing means for comparing the maximum value in the main scanning direction and the maximum value in the sub scanning direction so as to output, in accordance with the result of comparison, larger of the two values as a succession.

In this case, first, a threshold value is calculated from all image data in the specific region, and the pixel data in the specific region are converted in accordance with the threshold value, and then the number of succeeding pixels of equal density in the pixels in the specific region after conversion is calculated per each line in the main scanning direction and in the sub scanning direction, and thereafter the number of succeeding pixels of equal density thus calculated is added with respect to adjacent image data in the main scanning direction and in the sub scanning direction, and from the results of addition, the maximum value in the main scanning direction and the maximum value in the sub scanning direction are determined as the main scanning direction succession and the sub scanning direction succession, respectively, and the features of the image are discriminated in accordance with larger one of the main scanning direction succession and the sub scanning direction succession. Therefore, the feature parameter data used for discrimination of image features are reduced, thus reducing the size of the circuit.

The succession extracting means is means for extracting the maximum value and the minimum value in the main scanning direction and the maximum value and the minimum value in the sub scanning direction, and it is preferable that the succession extracting means includes difference calculating circuit for calculating a difference between the maximum value and the minimum value with respect to each in the main scanning direction and in the sub scanning direction, and comparing means for comparing the difference in the main scanning direction and the difference in the sub scanning direction so as to output larger of the two values as a succession.

In this case, first, a threshold value is calculated from all image data in the specific region, and the pixel data in the specific region are converted in accordance with the threshold value, and then the number of succeeding pixels of equal density in the pixels in the specific region after conversion is calculated per each line in the main scanning direction and in the sub scanning direction, and thereafter the number of succeeding pixels of equal density thus calculated is summed up among adjacent image data in the main scanning direction and in the sub scanning direction, and from the results of summation, a difference between the maximum value and the minimum value in the main scanning direction and a difference between the maximum value and the minimum value in the sub scanning direction are determined, and the features of the image are discriminated in accordance with larger value of the differences in the main scanning direction and in the sub scanning direction. Thus, the image features can be discriminated while more accurately reflecting the relationship between succeeding pixels.

For a fuller understanding of the nature and advantages of the invention, reference should be made to the ensuing detailed description taken in conjunction with the accompanying drawings.

DESCRIPTION OF THE EMBODIMENTS

Figure 1:
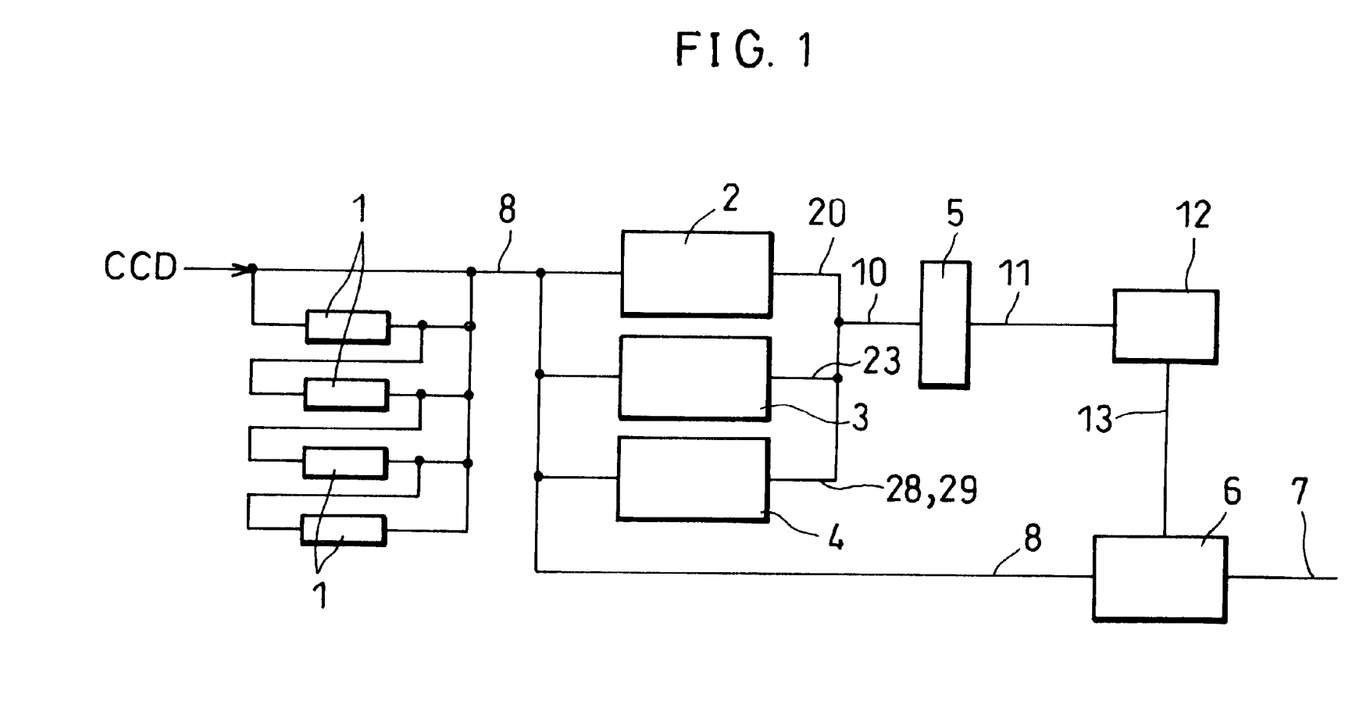
FIG. 1 is a drawing showing a structure of an image processing circuit in accordance with one embodiment of the present invention.

FIG. 1 is a drawing showing a structure of an image processing circuit in accordance with one embodiment of the present invention. The image processing circuit is provided with a plurality of line memories 1, a complexity extracting circuit 2, a comparing-subtracting circuit 3, a succession calculating circuit 4, a judging circuit 5, a mode selecting circuit 12, and a filtering process circuit 6.

The line memories 1 are provided in the number which is one less than the number of pixels in a main scanning direction and in a sub scanning direction, included in a specific region composed of (a) a target pixel to be subjected to feature discrimination and (b) surrounding pixels of the target pixel. For example, when the specific region has 5 pixels×5 pixels, four line memories 1 are provided in parallel. The four line memories 1 store, in synchronization with a system clock, an image signal of 8 bits obtained by scanning of a document by a photoelectric conversion device such as a CCD sensor so as to always output image data 8 of five lines in parallel. The 8 bit image data 8 of five lines thus outputted are respectively inputted to the complexity extracting circuit 2, the comparing-subtracting circuit 3, and the succession calculating circuit 4, respectively.

The complexity extracting circuit 2, the comparing-subtracting circuit 3, and the succession calculating circuit 4 constitute feature parameter extracting means of the present invention. The complexity extracting circuit 2, the comparing-subtracting circuit 3, and the succession calculating circuit 4 respectively determine a complexity 20, a compared subtracted value 23, and successions 28 and 29 so as to output thereof as feature parameters, respectively. The feature parameters thus outputted from the complexity extracting circuit 2, the comparing-subtracting circuit 3, and the succession calculating circuit 4, respectively, are sent as an identification signal 10 to a judging circuit 5.

The judging circuit 5 is composed of a high speed SRAM, etc., and judges whether the target pixel within the specific region belongs to a character region, a spot region, or a photographic region in accordance with the identification signal 10 so as to output a discrimination result 11 to the mode selecting circuit 12.

The mode selecting circuit 12 decides a processing mode in accordance with the discrimination result 11, and outputs a coefficient 13 per processing mode which has been set beforehand. The coefficient 13 is inputted to the filtering process circuit 6 together with the image data 8 in the specific region.

The filtering process circuit 6 stores several types of image processes, and of the stored image processes, an image process which is selected in accordance with the coefficient 13 received from the mode selecting circuit 12 is carried out with respect to the image data 8. The filtering process circuit 6 carries out, for example, an enhancement process with respect to image data 8 of the character region, and a smoothing process with respect to image data 8 of the spot region, and no image process is carried out with respect to image data 8 of the photographic region, and the result of the image process is outputted as a filtering process result 7.

Figure 2:
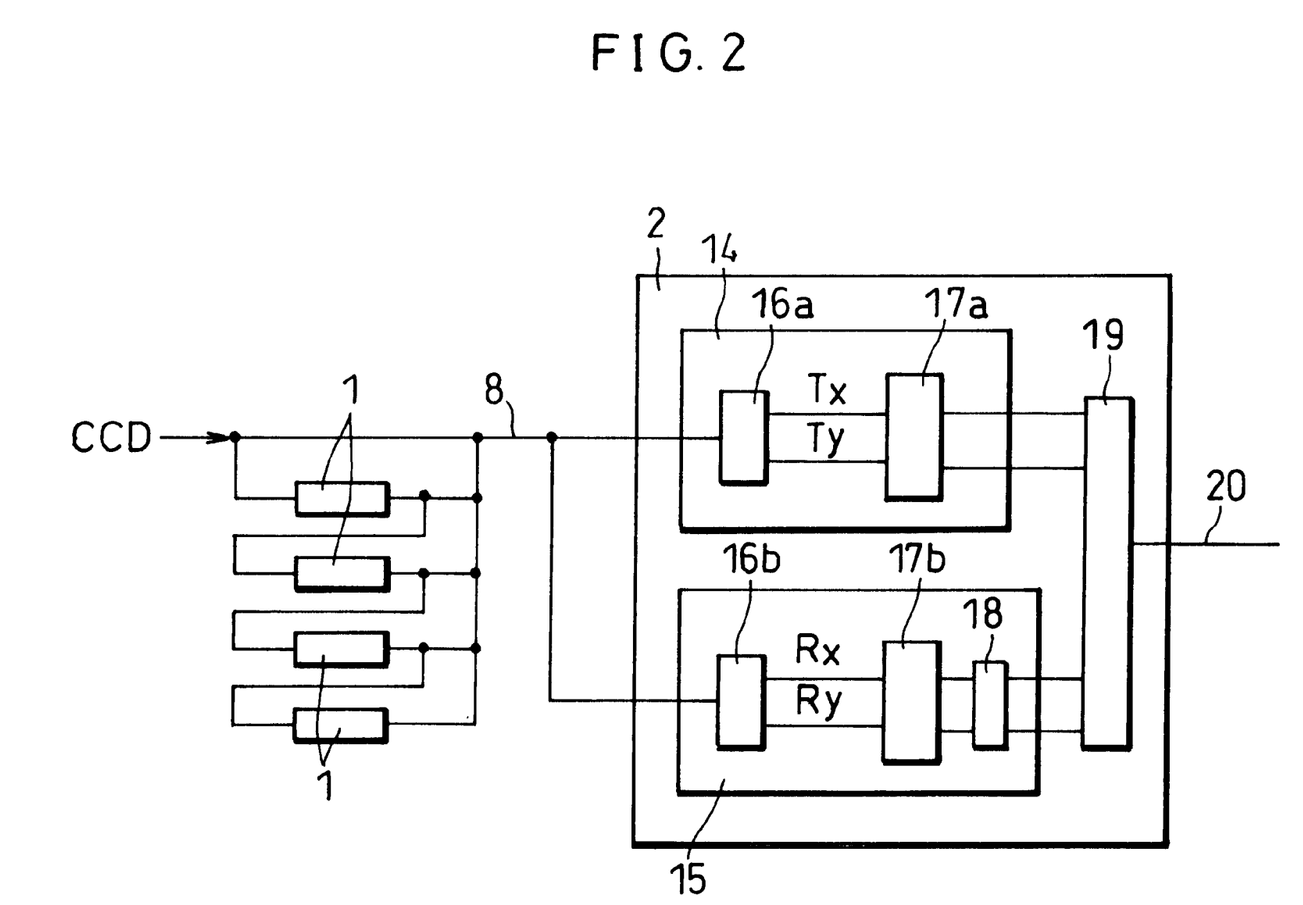
FIG. 2 is a drawing showing in detail a complexity extracting circuit constituting the image processing circuit.

FIG. 2 is a drawing showing in detail the complexity extracting circuit 2 constituting the image processing circuit. The complexity extracting circuit 2 is provided with a vertical-horizontal complexity extracting circuit 14, a diagonal complexity extracting circuit 15, and a comparing circuit 19. The vertical-horizontal complexity extracting circuit 14 is provided with a difference absolute value calculating circuit 16a and a sequential adding circuit 17a. The diagonal complexity extracting circuit 15 is provided with a difference absolute value calculating circuit 16b, a sequential adding circuit 17b, and a normalizing circuit 18.

In the complexity extracting circuit 2 having the above arrangement, the image data 8 inputted via the line memories 1 are sent respectively to the vertical-horizonal complexity extracting circuit 14 and the diagonal complexity extracting circuit 15. In the vertical-horizontal complexity extracting circuit 14, the difference absolute value calculating circuit 16a calculates an absolute value (Tx) of the difference between pixels in the main scanning direction and an absolute value (Ty) of the difference between pixels in the sub scanning direction, and the sequential adding circuit 17a determines the sum of the absolute values with respect to each in the main scanning direction and in the sub scanning direction.

In the diagonal complexity extracting circuit 15, the difference absolute value calculating circuit 16b calculates an absolute value (Rx) of the difference between pixels in the diagonal main scanning direction and an absolute value (Ry) of the difference between pixels in the diagonal sub scanning direction, and the sequential adding circuit 17b determines the sum of the absolute values with respect to each in the diagonal main scanning direction and in the diagonal sub scanning direction, and the normalizing circuit 18 normalizes the results of summation in the diagonal main scanning direction and in the diagonal sub scanning direction, respectively.

The comparing circuit 19 compares the absolute value (Tx) of the difference between pixels in the main scanning direction, the absolute value (Ty) of the difference between pixels in the sub scanning direction, the absolute value (Rx) of the difference between pixels in the diagonal main scanning direction, and the absolute value (Ry) of the difference between pixels in the diagonal sub scanning direction, and outputs the smallest value among such absolute values as the complexity 20 (13 bits).

Figure 3:
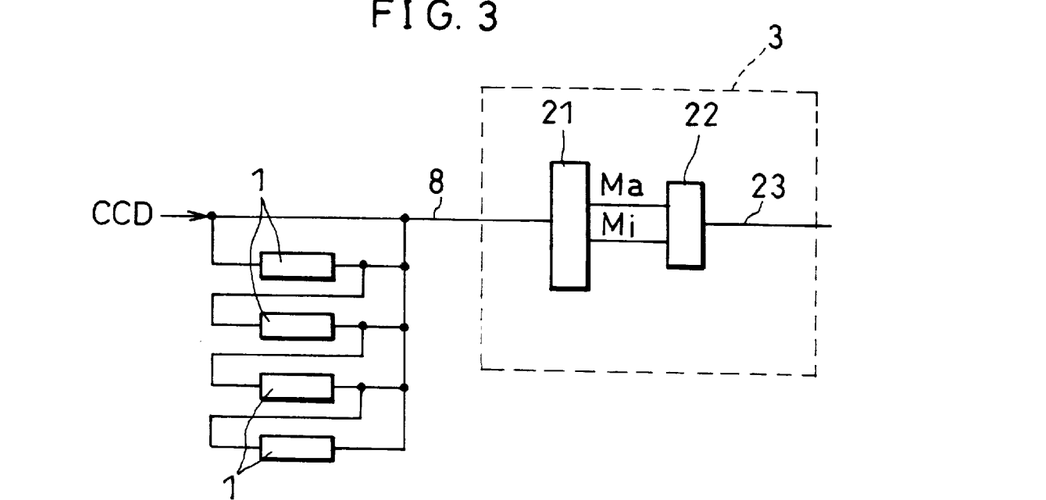
FIG. 3 is a drawing showing in detail a comparing-subtracting circuit constituting the image processing circuit.

FIG. 3 is a drawing showing in detail the comparing-subtracting circuit 3 constituting the image processing circuit. The comparing-subtracting circuit 3 is provided with a comparing circuit 21 and a subtracting circuit 22. In the comparing-subtracting circuit 3, the comparing circuit 21 compares the image data of first line through fifth line constituting the image data 8 inputted via the line memories 1 so as to determine a maximum value (Ma) and a minimum value (Mi) of the image data 8, and the subtracting circuit 22 determines the difference of the maximum value (Ma) and the minimum value (Mi) in the specific region so as to output the result as the compared subtracted value 23 (8 bits).

Figure 4:
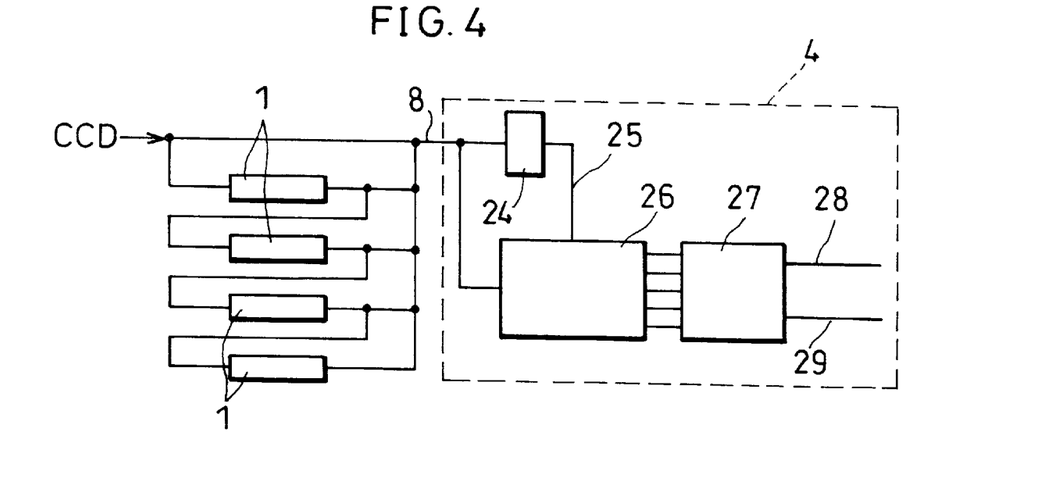
FIG. 4 is a drawing showing in detail a succession calculating circuit constituting the image processing circuit.

FIG. 4 is a drawing showing in detail the succession calculating circuit 4 constituting the image processing circuit. The succession calculating circuit 4 is provided with an average value calculating circuit 24, a multivalue-binary converting circuit 26, and a succeeding black pixels calculating circuit 27. In the succession calculating circuit 4, the average value calculating circuit 24 determines an average value 25 of the image data 8 in the specific region inputted via the line memories 1, and the multivalue-binary converting circuit 26 converts, in accordance with the average value 25, the image data 8 into binary data in which the entire image data 8 in the specific region are separated into black pixels and white pixels. Here, the data representing black pixels are denoted as an "H" level, and the data representing white pixels are denoted as an "L" level.

The succeeding black pixels calculating circuit 27 calculates, using the converted binary data, the number of succeeding black pixels with respect to the pixels in the specific region in the main scanning direction and in the sub scanning direction, and thereafter determines the sum of adjacent data with respect to the calculated number of succeeding black pixels of five lines per main scanning direction and per sub scanning direction. Then, the succeeding black pixels calculating circuit 27 determines the maximum value of four summed values of adjacent data with respect to each in the main scanning direction and in the sub scanning direction so as to output the respective maximum values as a main scanning direction maximum succession 28 (3 bits) and a sub scanning direction maximum succession 29 (3 bits), respectively.

Figure 5:
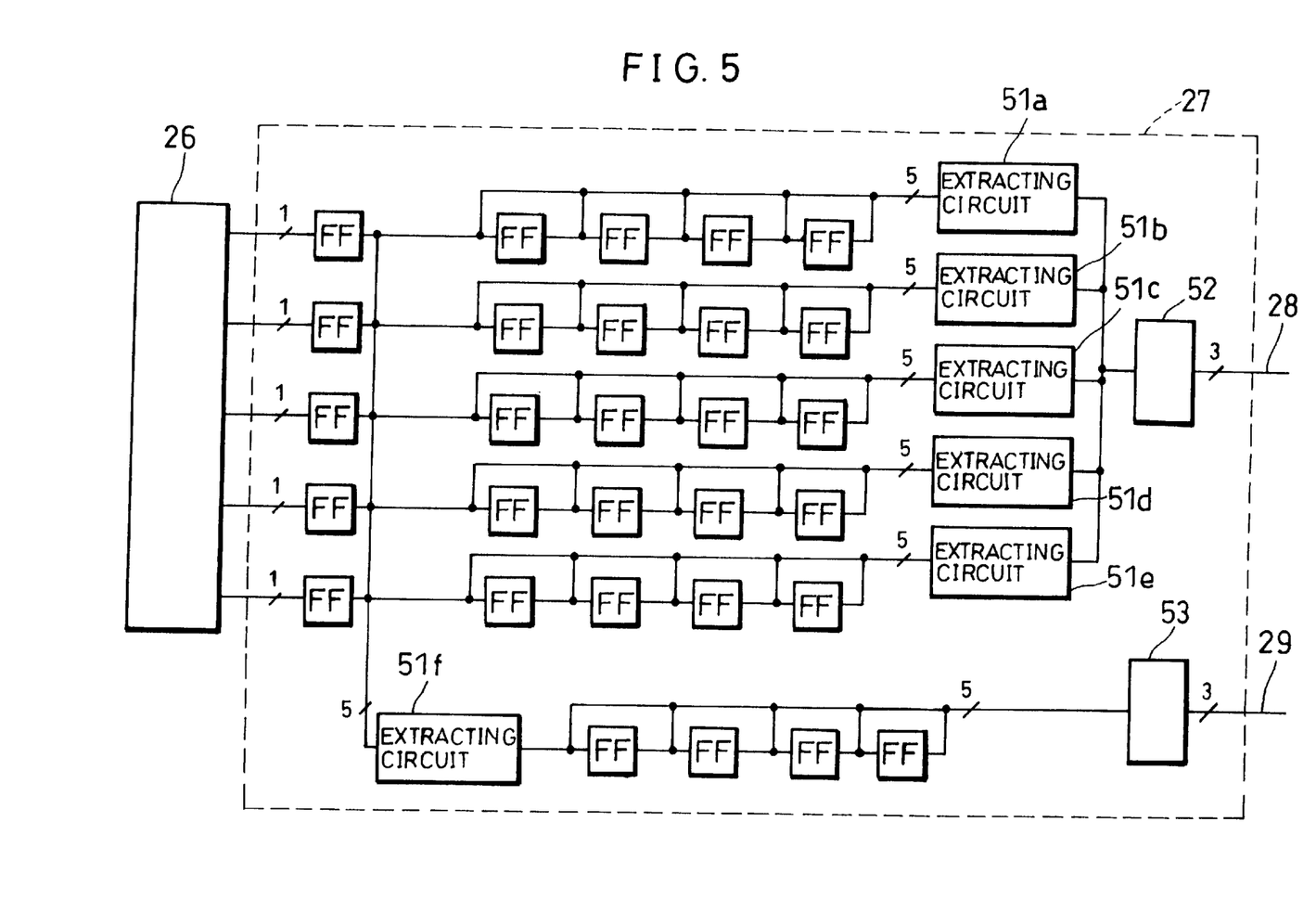
FIG. 5 is a drawing showing in detail a succeeding black pixels calculating circuit constituting the succession calculating circuit.

FIG. 5 is a drawing showing in detail the succeeding black pixels calculating circuit 27 constituting the succession calculating circuit 4. The succeeding black pixels calculating circuit 27 is provided with (a) extracting circuits 51a through 51e for extracting the number of succeeding black pixels with respect to each of five lines in the main scanning direction in the specific region, (b) an extracting circuit 51f for extracting the number of succeeding black pixels with respect to each of five lines in the sub scanning direction in the specific region, (c) a comparing circuit 52 for outputting, as the main scanning direction maximum succession 28, the maximum value of the summed values of the number of succeeding black pixels of adjacent 2 lines in the main scanning direction, and (d) a comparing circuit 53 for outputting, as the sub scanning direction maximum succession 29, the maximum value of the summed values of the number of succeeding black pixels of adjacent 2 lines in the sub scanning direction.

The succeeding black pixels calculating circuit 27 receives, per pixel, binary data of five lines in the main scanning direction in the specific region from the multivalue-binary converting circuit 26. The binary data thus received from the multivalue-binary converting circuit 26 are inputted, via flip-flops provided in 5 stages per each line in the main scanning direction, to the extracting circuits 51a through 51e, respectively, as data of 5 pixels per each line in the main scanning direction. The binary data inputted from the multivalue-binary converting circuit 26 are also sent to the extracting circuit 51f per line in the sub scanning direction via flip-flops of the first stage provided per each line in the main scanning direction.

Figure 6:
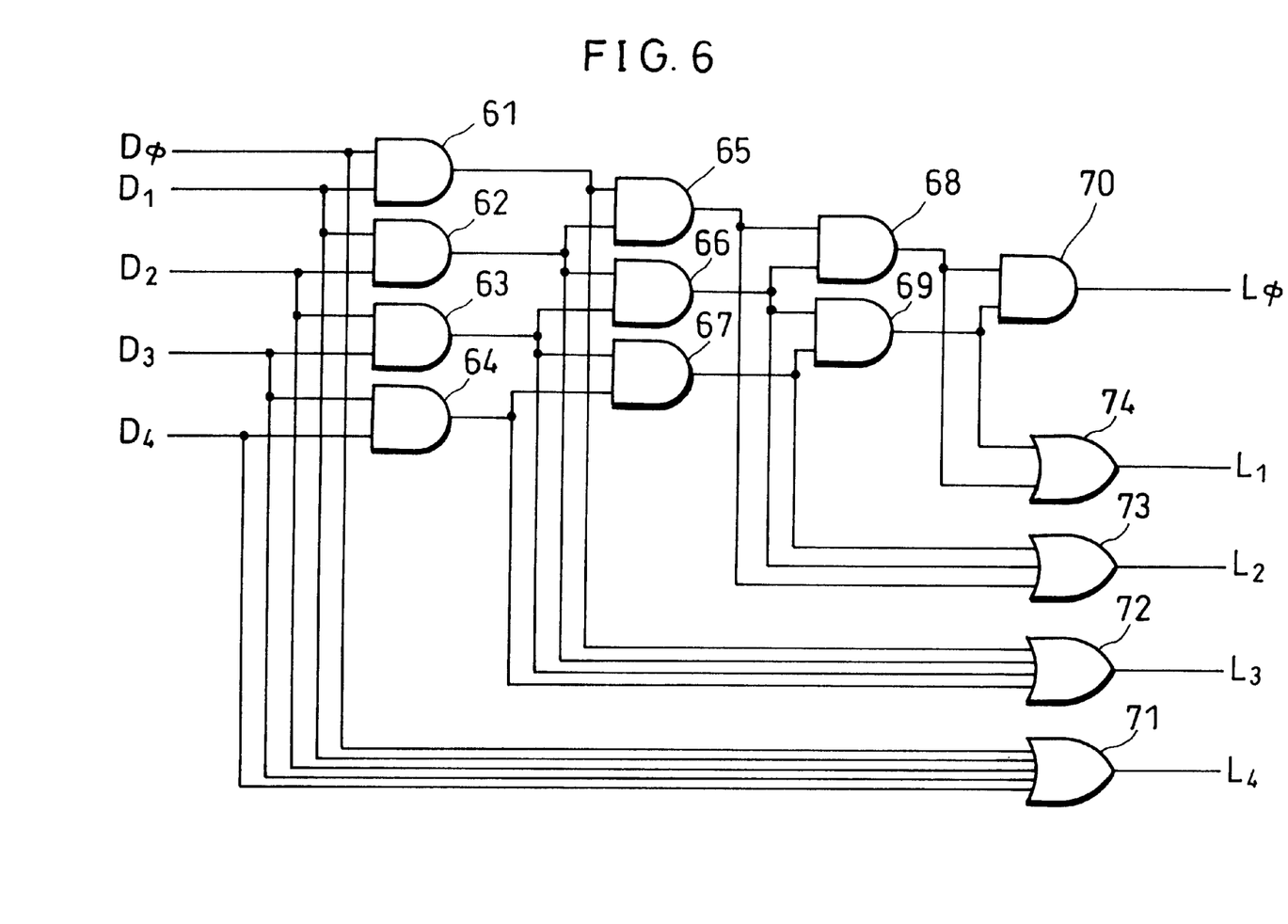
FIG. 6 is a drawing showing a structure of an extracting circuit provided in the succeeding black pixels calculating circuit.

Each of the extracting circuits 51a through 51f is provided with, as shown in FIG. 6, (1) AND gates 61 through 64 constituting a gate row of the first stage, (2) AND gates 65 through 67 constituting a gate row of the second stage, (3) AND gates 68 and 69 constituting a gate row of the third stage, (4) an AND gate 70 constituting a gate row of the fourth stage, and (5) OR gates 71 through 74.

The AND gate 61 conducts logical AND, of the binary data of 5 pixels constituting each line in the main scanning direction and in the sub scanning direction, with respect to data $D_0$ of the first pixel and data $D_1$ of the second pixel. The AND gate 62 conducts logical AND with respect to the data $D_1$ of the second pixel and data $D_2$ of the third pixel. The AND gate 63 conducts logical AND with respect to the data $D_2$ of the third pixel and data $D_3$ of the fourth pixel. The AND gate 64 conducts logical AND with respect to the data $D_3$ of the fourth pixel and data $D_4$ of the fifth pixel.

The AND gate 65 conducts logical AND with respect to the output of the AND gate 61 and the output of the AND gate 62. The AND gate 66 conducts logical AND with respect to the output of the AND gate 62 and the output of the AND gate 63. The AND gate 67 conducts logical AND with respect to the output of the AND gate 63 and the output of the AND gate 64. The AND gate 68 conducts logical AND with respect to the output of the AND gate 65 and the output of the AND gate 66. The AND gate 69 conducts logical AND with respect to the output of the AND gate 66 and the output of the AND gate 67. The AND gate 70 conducts logical AND with respect to the output of the AND gate 68 and the output of the AND gate 69.

The OR gate 71 conducts logical OR with respect to the binary data of 5 pixels constituting each line in the main scanning direction and in the sub scanning direction. The OR gates 72 through 74 respectively conduct logical OR with respect to the outputs of respective gate rows of the AND gates 61 through 69 constituting the gate rows of the first through third stages.

With this arrangement, in the case where there are 5 succeeding black pixels, all the outputs of the following gates become an "H" level: The AND gates 61 through 64 constituting the gate row of the first stage, the AND gates 65 through 67 constituting the gate row of the second stage, the AND gates 68 and 69 constituting the gate row of the third stage, and the AND gate 70 (output is $L_0$) constituting the gate row of the fourth stage. Here, all the outputs ($L_1$ through $L_4$) of the OR gates 71 through 74 also become an "H" level.

In the case where there are 4 succeeding black pixels, three of the four outputs of the AND gates 61 through 64 constituting the gate row of the first stage become an "H" level (remaining one output becomes an "L" level), and two of the three outputs of the AND gates 65 through 67 constituting the gate row of the second stage become an "H" level (remaining one output becomes an "L" level), and one of the two outputs of the AND gates 68 and 69 constituting the gate row of the third stage becomes an "H" level (remaining one output becomes an "L" level), and the output of the AND gate 70 constituting the gate row of the fourth stage becomes an "L" level. Here, all the outputs of the OR gates 71 through 74 also become an "H" level.

In the case where there are 3 succeeding black pixels, two of the four outputs of the AND gates 61 through 64 constituting the gate row of the first stage become an "H" level (remaining two output become an "L" level), and one of the three outputs of the AND gates 65 through 67 constituting the gate row of the second stage becomes an "H" level (remaining two output become an "L" level), and the outputs of the AND gates 68 and 69 constituting the gate row of the third stage both become an "L" level, and the output of the AND gate 70 constituting the gate row of the fourth stage becomes an "L" level. Here, the outputs ($L_2$ through $L_4$) of the OR gates 71 through 73 become an "H" level, and the output ($L_1$) of the OR gate 74 becomes an "L" level.

In the case where there are 2 succeeding black pixels, one of the four outputs of the AND gates 61 through 64 constituting the gate row of the first stage becomes an "H" level (remaining three output become an "L" level), and the outputs of the AND gates 65 through 67 constituting the gate row of the second stage, the outputs of the AND gates 68 and 69 constituting the gate row of the third stage, and the output of the AND gate 70 constituting the gate row of the fourth stage all become an "L" level. Here, the outputs ($L_3$ and $L_4$) of the OR gates 71 and 72 become an "H" level, and the outputs ($L_1$ and $L_2$) of the OR gates 73 and 74 become an "L" level.

In the case where there is only 1 black pixel, the outputs of the AND gates 61 through 64 constituting the gate row of the first stage, the outputs of the AND gates 65 through 67 constituting the gate row of the second stage, the outputs of the AND gates 68 and 69 constituting the gate row of the third stage, and the output of the AND gate 70 constituting the gate row of the fourth stage all become an "L" level. Here, only the output ($L_4$) of the OR gate 71 becomes an "H" level, and the outputs ($L_1$ through $L_3$) of the OR gates 72 through 74 become an "L" level.

With this arrangement, in the extracting circuits 51a through 51f, in each line composed of 5 pixels in the main scanning direction and in the sub scanning direction, in the case where there are 5 succeeding black pixels, the output $L_0$ of the AND gate 70 becomes an "H" level, and in the case where there are 4 succeeding black pixels, the output $L_1$ of the OR gate 74 becomes an "H" level, and in the case where there are 3 succeeding black pixels, the output $L_2$ of the OR gate 73 becomes an "H" level, and in the case where there are 2 succeeding black pixels, the output $L_3$ of the OR gate 72 becomes an "H" level, and in the case where there is only 1 black pixel, the output $L_4$ of the OR gate 71 becomes an "H" level, and the number of succeeding black pixels in each line is determined, as shown in Table 1, in accordance with how the states of the output signals $L_1$ through $L_4$ are combined with one another.

TABLE 1

| $L_0$ | $L_1$ | $L_2$ | $L_3$ | $L_4$ | THE NUMBER OF SUCCEEDING BLACK PIXELS |
|---|---|---|---|---|---|
| 1 | 1 | 1 | 1 | 1 | 5 |
| 0 | 1 | 1 | 1 | 1 | 4 |
| 0 | 0 | 1 | 1 | 1 | 3 |
| 0 | 0 | 0 | 1 | 1 | 2 |

TABLE 1-continued

| $L_0$ | $L_1$ | $L_2$ | $L_3$ | $L_4$ | THE NUMBER OF SUCCEEDING BLACK PIXELS |
|---|---|---|---|---|---|
| 0 | 0 | 0 | 0 | 1 | 1 |
| 0 | 0 | 0 | 0 | 0 | 0 |

In the case where the extracting circuits 51 a through 51f for extracting the number of succeeding black pixels in each line in the main scanning direction and in the sub scanning direction are provided in such a manner that the AND gates are arranged in a single gate row, it is required to provide an AND gate corresponding to each combination of succeeding black pixels in each line in the specific region, and in the case where each line is composed of 5 pixels, it is required to provide 18 AND gates. In contrast, in the image processing circuit in accordance with the present embodiment, as shown in FIG. 6, since the AND gates are arranged in gate rows of a plurality of stages so as to constitute the extracting circuits 51a through 51f, it is possible to reduce the number of AND gates required to 10, thus simplifying the structure of the circuit.

In the succeeding black pixels calculating circuit 27 of FIG. 5, the outputs of the extracting circuits 51a through 51e for respectively extracting the number of succeeding black pixels in the five lines in the specific region are sent to the comparing circuit 52. The comparing circuit 52 determines the sum of the number of succeeding black pixels of adjacent two lines of the five lines in the main scanning direction, and outputs, as the main scanning direction maximum succession 28, the maximum value of the four summed values obtained.

On the other hand, the outputs of the extracting circuit 51f for extracting the number of succeeding black pixels in each line in the sub scanning direction in the specific region are sent, as data of five lines in the sub scanning direction, to the comparing circuit 53 via four flip-flops. The comparing circuit 53 determines the sum of the number of succeeding black pixels of adjacent two lines of the five lines in the sub scanning direction, and outputs, as the sub scanning direction maximum succession 29, the maximum value of the four summed values obtained. The comparing circuit 53, together with the comparing circuit 52, constitutes succession extracting means.

Figure 7:
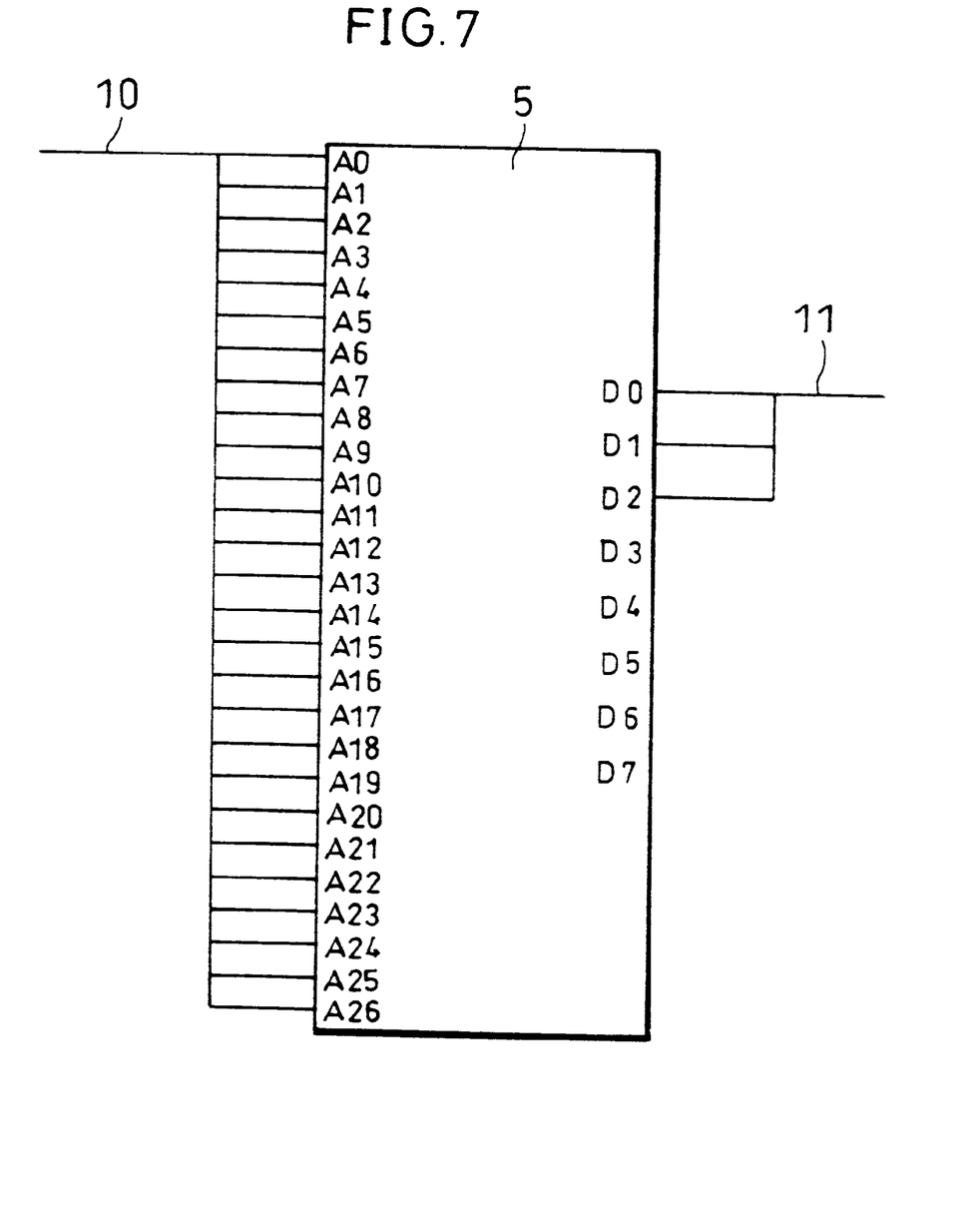
FIG. 7 is a drawing showing in detail a judging circuit constituting the image processing circuit.
Figure 8:
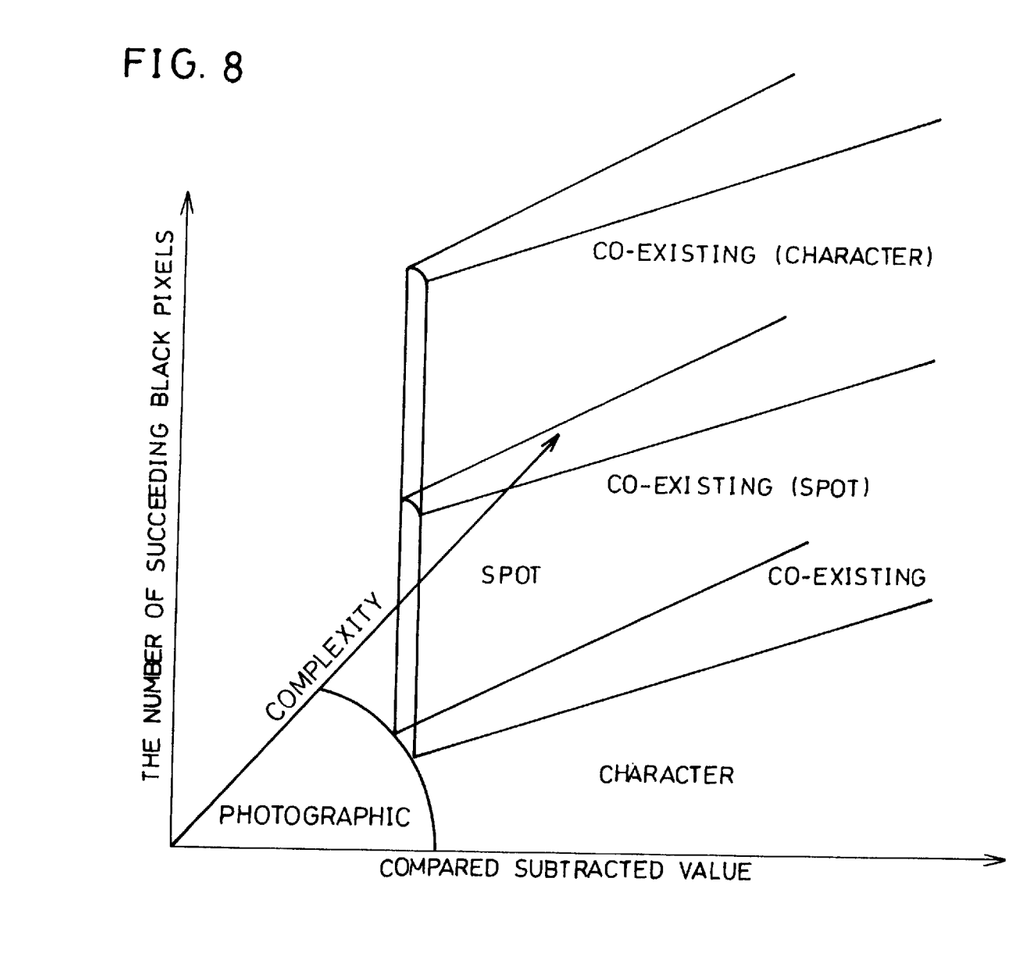
FIG. 8 is a drawing showing a relationship between (i) respective complexity, compared-subtracted value, and the number of succeeding black pixels and (ii) a type of a region including a target pixel.

FIG. 7 is a drawing showing in detail the judging circuit 5 constituting the image processing circuit. The judging circuit 5 is provided with (i) address terminals A0 through A26 of 27 bits (13 bits for complexity 20, 8 bits for compared subtracted value 23, and 3 bits each for successions 28 and 29) on the input side of the identification signal 10 and (ii) data terminal D0 through D2 of 3 bits on the output side of the discrimination result 11. The judging circuit 5 stores the relationship between (A) complexity, compared subtracted value, and the number of succeeding black pixels and (B) the types of a region including the target pixel, for example, as shown in FIG. 8, in the form of three-dimensional coordinates having three axes of complexity, compared subtracted value, and the number of succeeding black pixels. The judging circuit 5 outputs, from the data terminals D0 through D2 to the mode selecting circuit 12, in accordance with the relationship of FIG. 8, the discrimination result 11 indicative of the type of a region including the target pixel, corresponding to the complexity 20, the compared subtracted value 23, and the successions 28 and 29 included in the identification signal 10 inputted into the address terminals A0 through A26.

The mode selecting circuit 12 stores beforehand the relationship between the type of a region and a coefficient per image processing mode which should be carried out, and selects from eight types of image processing modes such as an enhancement process and a smoothing process, a coefficient of the image processing mode corresponding to the discrimination result 11 which has been received from the judging circuit 5, and outputs the coefficient thus selected to the filtering process circuit 6. The mode selecting circuit 12 stores, as a coefficient per image processing mode, for example, as shown in FIG. 9(A) through FIG. 9(H), eight types of combinations of coefficients. In respective coefficient groups of FIG. 9(A) through FIG. 9(H), the value of a coefficient per pixel takes six kinds of values as represented by K1 through K6 in FIG. 10, in accordance with a distance from the target pixel positioned at the center of the specific region.

Figure 9A:
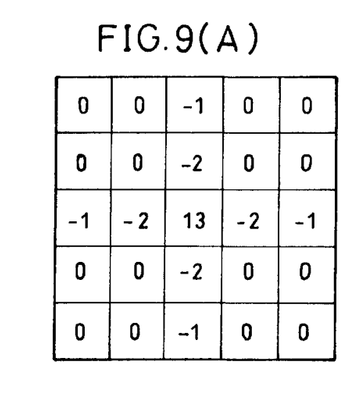
FIG. 9(A) through FIG. 9(H) are drawings showing coefficient groups per image processing mode, stored in a mode selecting circuit constituting the image processing circuit.
Figure 9B:
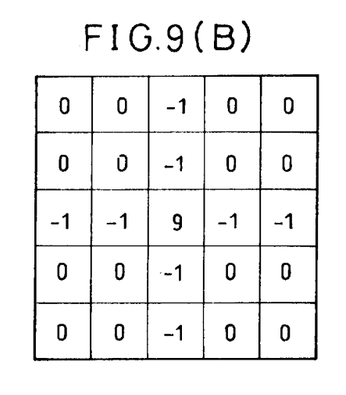
Figure 9C:
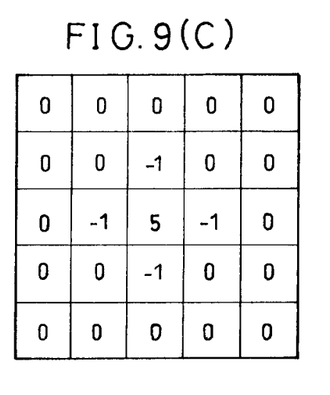
Figure 9D:
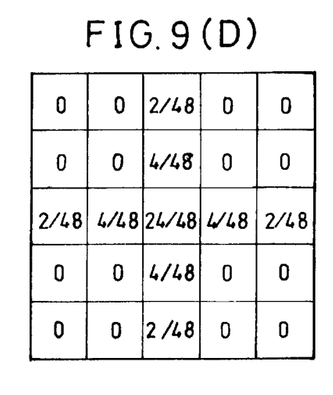
Figure 9E:
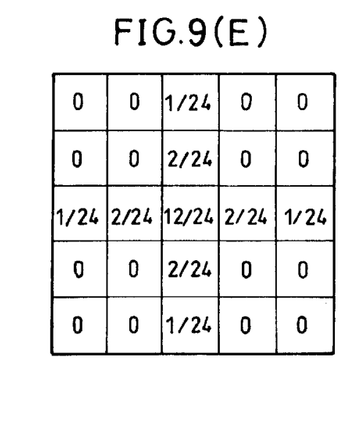
Figure 9F:
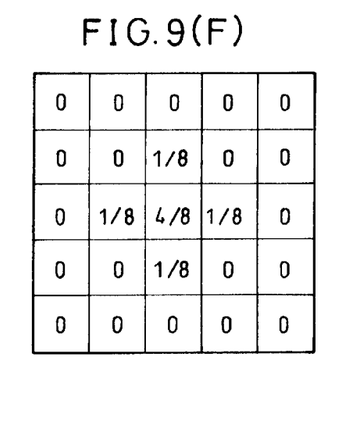
Figure 9G:
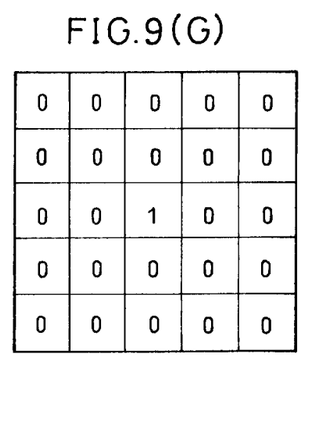
Figure 9H:
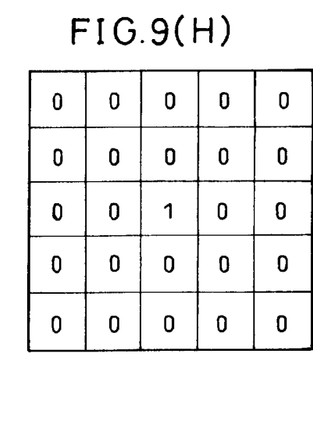
Figure 10:
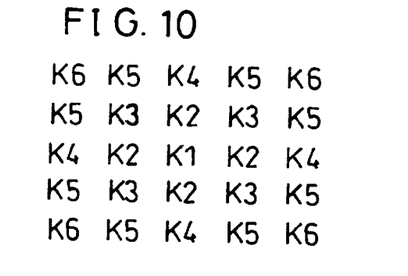
FIG. 10 is a drawing showing general values of coefficient values each of which is set to each pixel in the coefficient groups.

FIG. 9(A) through FIG. 9(C) are coefficient groups of an enhancement process mode which should be carried out with respect to the character region. In the case where the feature parameter extracted from the specific region has a large tendency to be the character region, the coefficient group of FIG. 9(A) is selected, and in the case where the feature parameter has a small tendency to be the character region, the coefficient group of FIG. 9(C) is selected, and in the case where the feature parameter has an intermediate tendency to be the character region, the coefficient group of FIG. 9(B) is selected. FIG. 9(D) through FIG. 9(F) are coefficient groups of a smoothing process mode which should be carried out with respect to the spot region. In the case where the feature parameter extracted from the specific region has a large tendency to be the spot region, the coefficient group of FIG. 9(D) is selected, and in the case where the feature parameter has a small tendency to be the spot region, the coefficient group of FIG. 9(F) is selected, and in the case where the feature parameter has an intermediate tendency to be the spot region, the coefficient group of FIG. 9(E) is selected. FIG. 9(G) and FIG. 9(H) are coefficient groups of a no processing mode with respect to the co-existing region and the photographic region, respectively.

Figure 11:
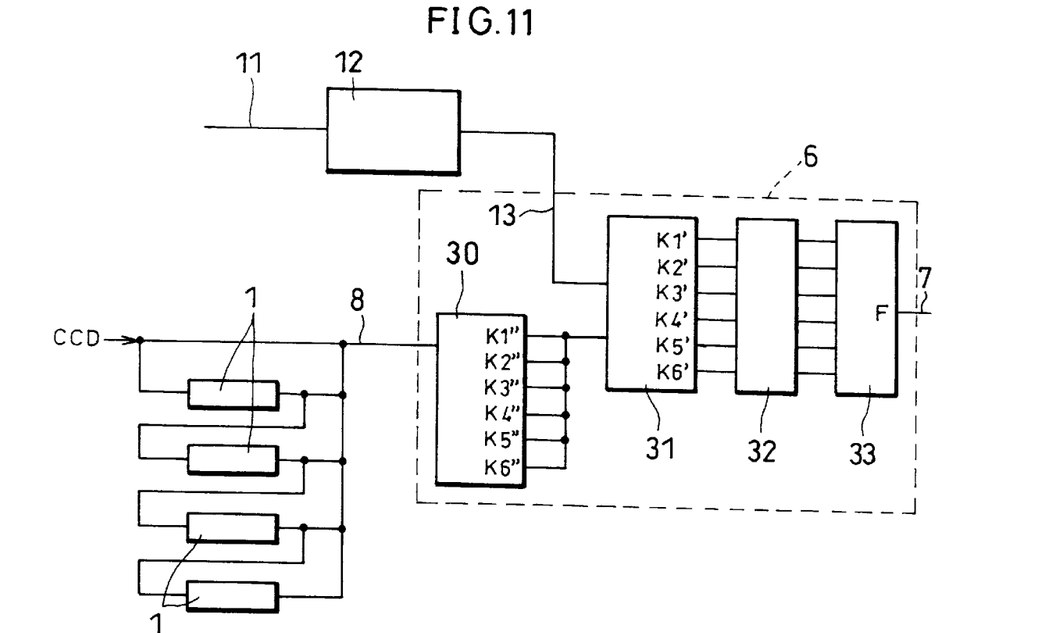
FIG. 11 is a drawing showing in detail a filtering process circuit constituting the image processing circuit.
Figure 12:
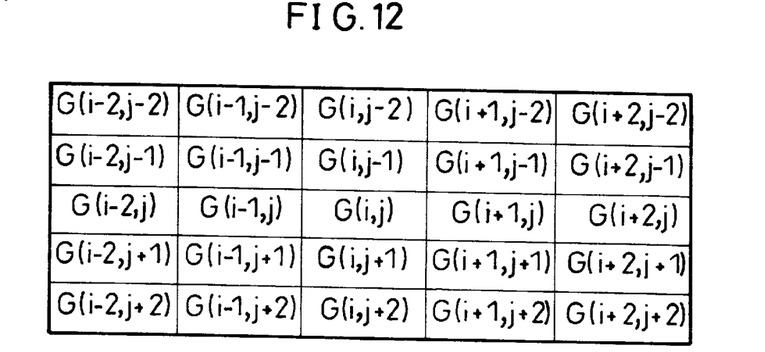
FIG. 12 is a drawing showing image data subjected to a filtering process by the filtering process circuit.

FIG. 11 is a drawing showing in detail the filtering process circuit constituting the image processing circuit. The filtering process circuit 6 is provided with an adding circuit 30, a multiplying circuit 31, a shifter circuit 32, and a summing circuit 33. The adding circuit 30 adds the image data 8 of each pixel in the specific region, sent from the line memories 1, in accordance with corresponding coefficient values of K1 through K6 of FIG. 10. Namely, the adding circuit 30 adds the image data of each pixel in the specific region, as represented in FIG. 12 where "i" is the coordinate in the main scanning direction of an image including the target pixel and "j" is the coordinate in the sub scanning direction, using the following equations of (1) through (6) so as to calculate the sums K1" through K6" of image data per respective coefficients K1 through K6.

$$K1"=G(i,j) \quad (1)$$

$$K2"=G(i,j-1)+G(i-1,j)+G(i+1,j)+G(i,j+1) \quad (2)$$

$$K3"=G(i-1,j-1)+G(i+1,j-1)+G(i-1,j+1)+G(i+1,j+1) \quad (3)$$

$$K4"=G(i,j-2)+G(i-2,j)+G(i+2,j)+G(i,j+2) \quad (4)$$

$$K5"=G(i-1,j-2)+G(i+1,j-2)+G(i-2,j-1)+G(i+2,j-1)+G(i-2,j+1)+G(i+2,j+1)+G(i-1,j+2)+G(i+1,j+2) \quad (5)$$

$$K6"=G(i-2,j-2)+G(i+2,j-2)+G(i-2,j+2)+G(i+2,j+2) \quad (6)$$

The multiplying circuit 31 multiplies the sums K1" through K6" of the image data as calculated by the adding circuit 30 by the coefficients K1 through K6 as selected by the mode selecting circuit 12, respectively, so as to calculate products K1' through K6' for respective coefficients of K1 through K6. Namely, the multiplying circuit 31 carries out the following calculations of (7) through (12).

$$K1'=K1\times K1"  \quad (7)$$

$$K2'=K2\times K2"  \quad (8)$$

$$K3'=K3\times K3"  \quad (9)$$

$$K4'=K4\times K4"  \quad (10)$$

$$K5'=K5\times K5"  \quad (11)$$

$$K6'=K6\times K6"  \quad (12)$$

The shifter circuit 32 divides the respective products K1' through K6', as calculated by the multiplying circuit 31, by the number of image data included in the sums K1" through K6" of the image data, respectively. Namely, the shifter circuit 32 divides the product K1' by "1", the products K2' through K4' and K6' by "4", and the product K5' by "8" so as to determine the average value of each product. The summing circuit 33 calculates the sum F of the products K1' through K6' averaged by the shifter circuit 32, and outputs the sum F thus calculated as image data 7 of the target pixel after filtering process.

Figure 13:
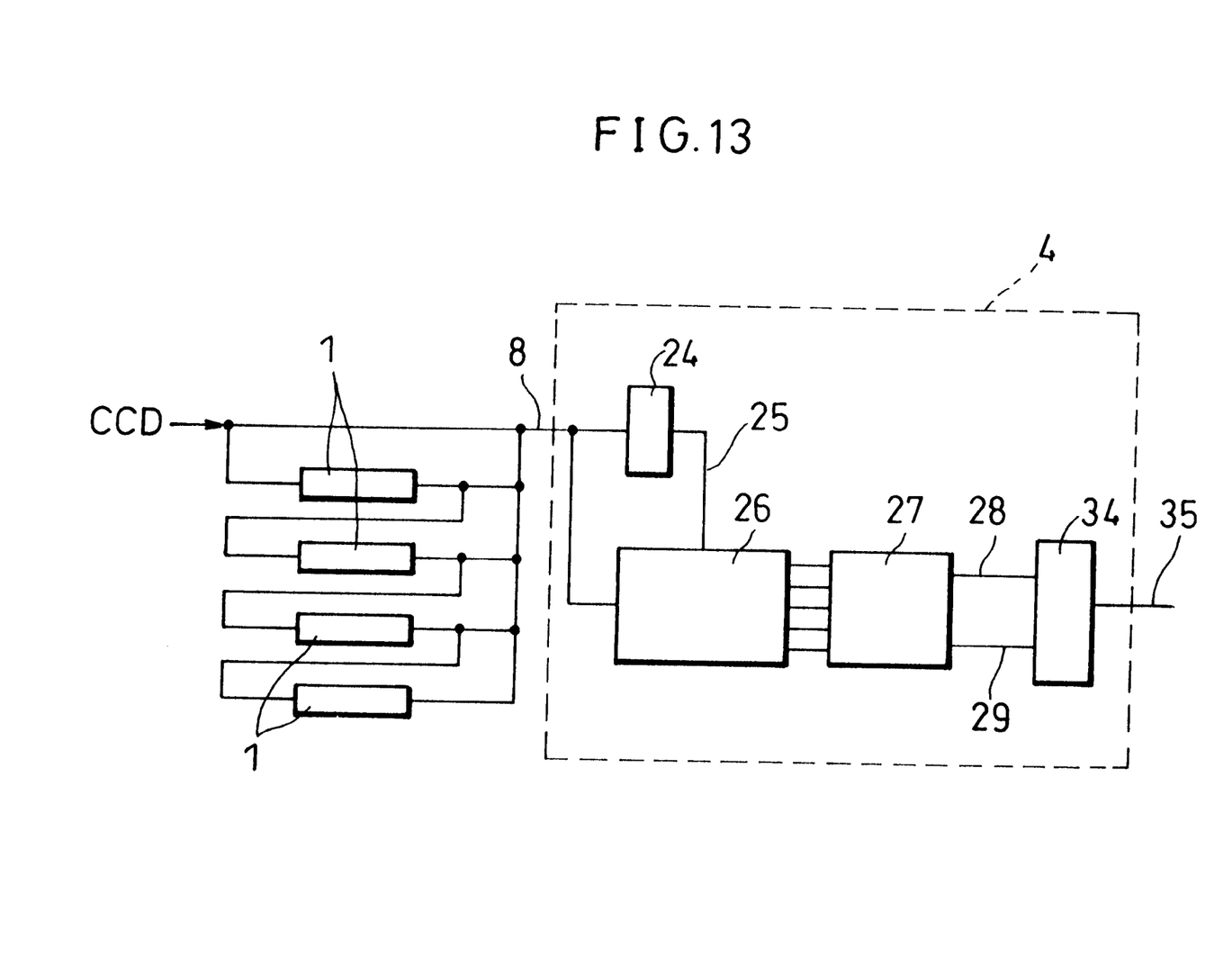
FIG. 13 is a drawing showing in detail a succession calculating circuit constituting an image processing circuit in accordance with another embodiment of the present invention.

FIG. 13 is a drawing showing a structure of a succession calculating circuit of an image processing circuit in accordance with another embodiment of the present invention. In FIG. 13, the members the same as that of FIG. 4 are given the same reference numerals and explanations thereof are omitted. The succession calculating circuit 4 of FIG. 13 has an arrangement wherein a comparing circuit 34 is added to the arrangement of FIG. 4. The comparing circuit 34 compares the main scanning direction maximum succession 28 and the sub scanning direction maximum succession 29, and outputs larger of the two values as a succession 35.

With this arrangement, the relationship between succeeding pixels in the main scanning direction and in the sub scanning direction is reflected in the discrimination result in accordance with the type of a region including the target pixel, and only a single succession 35 is outputted, thus reducing the size of the entire circuit.

Figure 14:
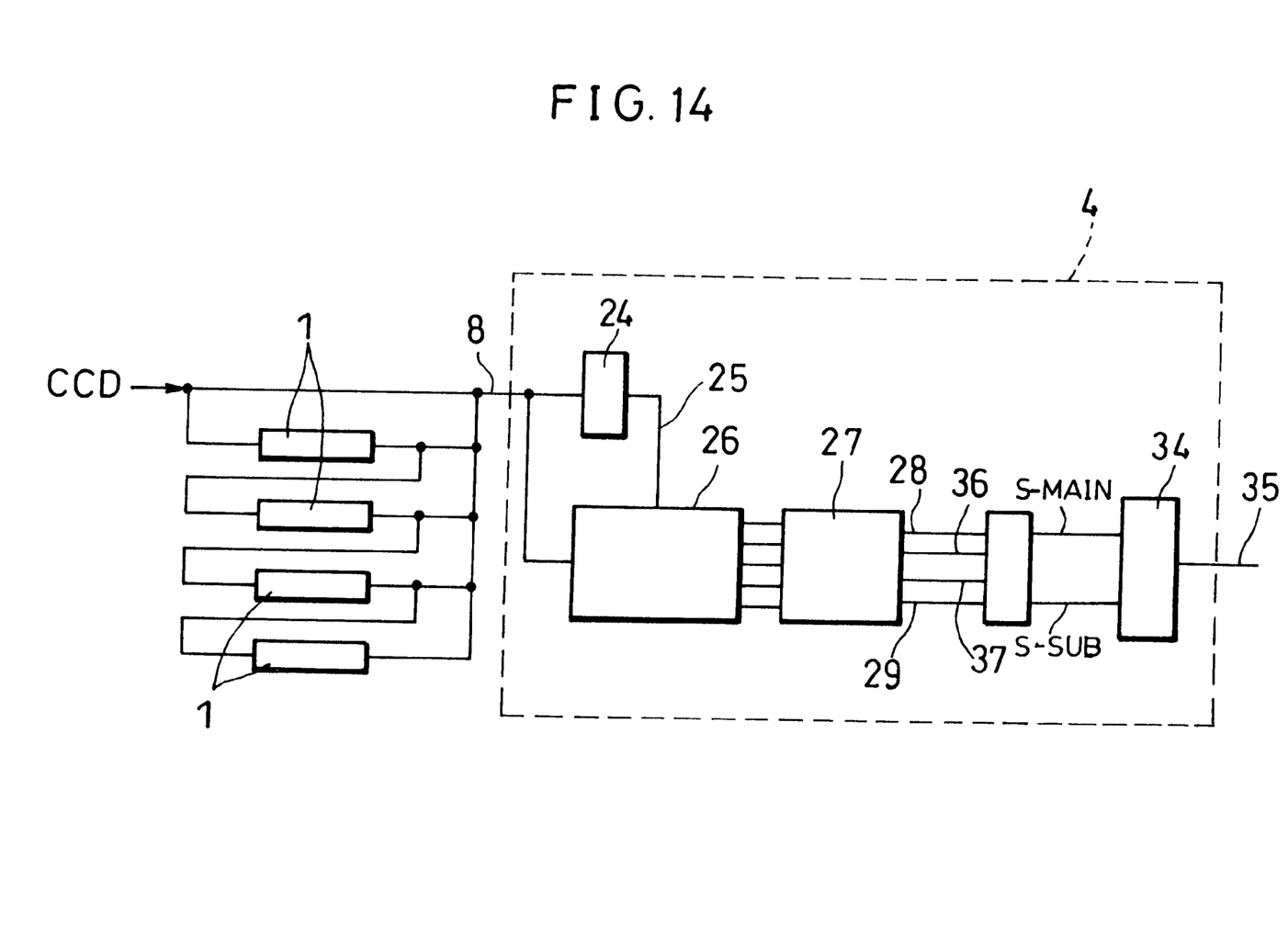
FIG. 14 is a drawing showing in detail a succession calculating circuit constituting an image processing circuit in accordance with still another embodiment of the present invention.

FIG. 14 is a drawing showing a structure of a succession calculating circuit of an image processing circuit in accordance with still another embodiment of the present invention. In FIG. 14, the members the same as that of FIG. 4 are given the same reference numerals and explanations thereof are omitted. The succession calculating circuit 4 of FIG. 14 has an arrangement wherein a subtracting circuit 38 and a comparing circuit 34 are added to the arrangement of FIG. 4. In the succession calculating circuit 4, a succeeding black pixels calculating circuit 27 extracts a main scanning direction maximum succession 28, a main scanning direction minimum succession 36, a sub scanning direction maximum succession 29, and a sub scanning direction minimum succession 37, and the subtracting circuit 38 calculates the respective subtracted values (S-main and S-sub) of the former two values and the latter two values, and the comparing circuit 34 compares the S-main and S-sub thus calculated and outputs larger of the two values as a succession 35 (3 bits).

With this arrangement, in the image processing circuit in accordance with the present embodiment, a succession is calculated from the main scanning direction maximum succession 28, the main scanning direction minimum succession 36, the sub scanning direction maximum succession 29, and the sub scanning direction minimum succession 37, thus minimizing an increase in the size of the circuit and further improving the discrimination accuracy of region types.

As described, in the image processing circuit of the present invention, a succession is extracted as a feature parameter in accordance with all the image data in the specific region including a target pixel, to be subjected to image feature discrimination, and a plurality of neighboring pixels surrounding the target pixel, and image features are discriminated using the succession thus extracted. Therefore, it is possible to improve the discrimination accuracy of the feature of a pixel to be a reference for selecting an image process which should be carried out, and to carry out an image process most suitable for the content of the image.

Also, with another image processing circuit of the present invention, the feature parameter data used for discrimination of image features are reduced without lowering the discrimination accuracy of the image features, thus reducing the size of the circuit.

With still another image processing circuit of the present invention, the image features can be discriminated while further reflecting the relationship between succeeding pixels, thus further improving the discrimination accuracy of image features.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing circuit for discriminating image features of a specific region on an image in accordance with image data obtained through scanning of a document so as to carry out image processing in accordance with an image feature discriminated, said image processing circuit comprising:

succession extracting means for extracting, in accordance with entire image data in the specific region, a succession indicative of how pixels of equal density in all pixels in the specific region succeed one another with respect to each in a main scanning direction and in a sub scanning direction;

wherein said succession extracting means includes:

average value calculating means for determining an average value of the image data in the specific region;

converting means for converting, in accordance with the average value, all the image data in the specific region into binary data that vary depending on density; and succeeding pixels calculating means for (1) calculating, in accordance with the binary data, the number of pixels of equal density in each of the main scanning direction and the sub scanning direction in the specific region, (2) adding the number of pixels of equal density with respect to adjacent image data in each of the main scanning direction and the sub scanning direction, and (3) determining, in accordance with results of addition, a main scanning direction maximum succession, which is a maximum value in the main scanning direction, and a sub scanning direction maximum succession, which is a maximum value in the sub scanning direction, so as to output the main and sub scanning direction maximum successions as the succession; and discriminating means for discriminating the image feature of the specific region in accordance with the main scanning direction maximum succession and the sub scanning direction maximum succession.

2. The image processing circuit as set forth in claim 1, wherein the succeeding pixels calculating means includes:

first extracting means for extracting the number of succeeding pixels of equal density with respect to the main scanning direction in the specific region;

second extracting means for extracting the number of succeeding pixels of equal density with respect to the sub scanning direction in the specific region;

first comparing means for outputting, as the main scanning direction maximum succession, a maximum value of the added values of the number of pixels of equal density with respect to adjacent image data in the main scanning direction; and second comparing means for outputting, as the sub scanning direction maximum succession, a maximum value of the added values of the numbers of pixels of equal density with respect to adjacent image data in the sub scanning direction.

3. The image processing circuit as set forth in claim 2, wherein each of the first extracting means includes:

in a case where the specific region is composed of N pixels in the main scanning direction, a gate row of first stage composed of (N−1) AND gates for conducting logical AND with respect to the binary data of adjacent pixels;

AND gate rows of a total of (N−2) stages connected to one another sequentially in cascade with respect to the gate row of first stage, the connection being made in such a manner that the number of AND gates of a following stage of succeeding two stages is less than by one the number of AND gates of a preceding stage;

a first OR gate for conducting logical OR with respect to N binary data inputted into the gate row of the first stage; and (N−2) OR gates for respectively conducting logical OR with respect to respective inputs of the AND gate rows of the (N−2) stages connected to one another sequentially in cascade.

4. The image processing circuit as set forth in claim 2, wherein each of the second extracting means includes:

in a case where the specific region is composed of N pixels in the sub scanning direction, a gate row of first stage composed of (N−1) AND gates for conducting logical AND with respect to the binary data of adjacent pixels;

AND gate rows of a total of (N−2) stages connected to one another sequentially in cascade with respect to the gate row of first stage, the connection being made in such a manner that the number of AND gates of a following stage of succeeding two stages is less than by one the number of AND gates of a preceding stage;

a first OR gate for conducting logical OR with respect to N binary data inputted into the gate row of the first stage; and (N−2) OR gates for respectively conducting logical OR with respect to respective inputs of the AND gate rows of the (N−2) stages connected to one another sequentially in cascade.

5. The image processing circuit as set forth in claim 2, wherein the succeeding pixels calculating means further includes third comparing means for comparing the main scanning direction maximum succession and the sub scanning direction maximum succession so as to output larger of the two values as the succession.

6. The image processing circuit as set forth in claim 1, wherein the succeeding pixels calculating means further includes comparing means for comparing the main scanning direction maximum succession and the sub scanning direction maximum succession so as to output larger of the two values as the succession.

7. An image processing circuit for discriminating image features of a specific region on an image in accordance with image data obtained through scanning of a document so as to carry out image processing in accordance with an image feature discriminated, said image processing circuit comprising:

succession extracting means for extracting, in accordance with entire image data in the specific region, a succession indicative of how pixels of equal density in all pixels in the specific region succeed one another with respect to each in a main scanning direction and in a sub scanning direction;

wherein said succession extracting means includes:

average value calculating means for determining an average value of the image data in the specific region;

converting means for converting, in accordance with the average value, all the image data in the specific region into binary data that vary depending on density;

succeeding pixels calculating means for (1) calculating, in accordance with the binary data, the number of pixels of equal density in each of the main scanning direction and the sub scanning direction in the specific region, (2) adding the number of pixels of equal density with respect to adjacent image data of each in the main scanning direction and in the sub scanning direction, and (3) determining and outputting, in accordance with results of addition, a main scanning direction maximum succession, which is a maximum value in the main scanning direction, a main scanning direction minimum succession, which is a minimum value in the main scanning direction, a sub scanning direction maximum succession, which is a maximum value in the sub scanning direction, and a sub scanning direction minimum succession, which is minimum value in the sub scanning direction;

difference calculating means for calculating a difference of the maximum value and the minimum value of the succession with respect to each in the main scanning direction and in the sub scanning direction; and comparing means for comparing the difference in the main scanning direction and the difference in the sub scanning direction so as to output larger of the two values as the succession; and discriminating means for discriminating the image feature of the specific region in accordance with the succession extracted.

8. An image processing circuit for discriminating, in accordance with multivalue image data obtained through scanning of a document, features of a specific region to which each pixel of an image belongs, comprising:

multivalue converting means for calculating a threshold value from all image data in the specific region so as to convert pixel data in the specific region in accordance with the threshold value;

succeeding pixels calculating means for calculating, in accordance with the pixel data converted, the number of pixels of equal density per line in each of the main scanning direction and the sub scanning direction;

succession extracting means for adding the number of pixels of equal density, as calculated by the succeeding pixels calculating means, with respect to adjacent image data in the main scanning direction and in the sub scanning direction, and determining, in accordance with results of addition, a maximum value in the main scanning direction and a maximum value in the sub scanning direction so as to output respective maximum values as a main scanning direction succession and a sub scanning direction succession, respectively; and discriminating means for discriminating the feature of the specific region in accordance with the main scanning direction succession and the sub scanning direction succession as extracted by said succession extracting means.

9. The image processing circuit as set forth in claim 8, wherein said succeeding pixels calculating means includes comparing means for comparing the main scanning direction succession and the sub scanning direction succession so as to output larger of the two values as the succession.

10. The image processing circuit as set forth in claim 8, wherein said succession extracting means extracts a maximum value and a minimum value in the main scanning direction and a maximum value and a minimum value in the sub scanning direction, said succession extracting means including:

difference calculating means for calculating a difference of the maximum value and the minimum value with respect to each in the main scanning direction and in the sub scanning direction; and comparing means for comparing the difference in the main scanning direction and the difference in the sub scanning direction so as to output larger of the two values as the succession.

\* \* \* \* \*